(12) United States Patent
Deshpande et al.

(10) Patent No.: US 8,369,496 B2
(45) Date of Patent: Feb. 5, 2013

(54) SYSTEM AND METHOD FOR MANAGING ABRUPT CONTACT DISCONNECTS

(75) Inventors: Prasad Deshpande, Kharadi (IN); Bharti Patwari Poorey, Kharadi (IN)

(73) Assignee: Avaya Inc., Basking Ridge, NJ (US)

( * ) Notice: Subject to any disclaimer, the term of this patent is extended or adjusted under 35 U.S.C. 154(b) by 388 days.

(21) Appl. No.: 12/844,521

(22) Filed: Jul. 27, 2010

(65) Prior Publication Data

US 2012/0027194 A1 Feb. 2, 2012

(51) Int. Cl.
*H04M 11/00* (2006.01)
(52) U.S. Cl. ............... 379/88.18; 379/88.01; 379/88.04; 379/88.23; 379/265.01; 379/255
(58) Field of Classification Search ............... 379/88.01, 379/88.04, 88.23, 265.01, 88.18, 255
See application file for complete search history.

(56) References Cited

U.S. PATENT DOCUMENTS

| 7,228,145 | B2 * | 6/2007 | Burritt et al. | 455/519 |
| 7,729,490 | B2 | 6/2010 | Hemm et al. | |
| 8,085,909 | B2 * | 12/2011 | Tischer et al. | 379/88.23 |
| 2006/0126803 | A1 * | 6/2006 | Patel et al. | 379/88.01 |
| 2007/0220127 | A1 * | 9/2007 | Adams et al. | 709/223 |
| 2009/0141872 | A1 | 6/2009 | Li et al. | |
| 2010/0284522 | A1 * | 11/2010 | Jaiswal et al. | 379/88.04 |

* cited by examiner

*Primary Examiner* — Joseph J Nguyen
(74) *Attorney, Agent, or Firm* — Maldjian Law Group LLC; John P. Maldjian, Esq.; Alexander D. Walter, Esq.

(57) ABSTRACT

Embodiments of the present invention relate to a system and method for managing abrupt contact disconnects. In accordance with one embodiment, there is provided a method for managing abrupt customer call disconnects from an IVR system, dependent upon variations of call disconnect scenarios, the method comprising detecting an abrupt customer call disconnect; storing IVR options selected by customer before the abrupt customer call disconnect; sending an SMS/voice message notification to the customer; receiving customer call re-connection; determining, whether there is status information of an abnormally terminated call corresponding to the customer call re-connection; retrieving status information of the abnormally terminated call; connecting the IVR system to the customer; and providing IVR system options to the customer based upon the particular disconnect scenario.

6 Claims, 6 Drawing Sheets

SYSTEM AND METHOD FOR MANAGING ABRUPT CONTACT DISCONNECTS

BACKGROUND OF THE INVENTION

1. Field of the Invention

Embodiments of the present invention generally relate to the management of abrupt disconnects of customer contacts at contact centers. More specifically, embodiments of the present invention relate to a system and method for managing abruptly disconnected contacts to interactive voice response (IVR) systems.

2. Description of Related Art

Automated transaction distribution systems, utilizing IVR systems, employ automated procedures to distribute customer specific transactions to available contact center agents, who are employed to handle those particular transactions requested by the customer. According to certain automated procedures, an attempt is made to match a customer's requested transaction to the best-qualified agent having the skills to handle the particular requirements of the transaction.

In performing the match, utilizing an IVR system, contacts (e.g., calls) are often placed in queues, which are then serviced by specific groupings of agents. The term "contacts" includes but is not limited to calls using a telephone, cellular telephone, VoIP telephone or Skype-like systems, whereby a customer may connect with an IVR system of a contact center by any of the aforementioned means. For simplicity, the terms "call" or "calls" will be used to include but not be limited to any of the above means of connecting with a contact center and utilizing its IVR system.

Although numerous algorithms have been developed to control the wait times for these waiting calls to receive service, it is not unusual for wait times to be excessive. A customer may become quite agitated and abruptly disconnect from the IVR system. Alternatively, an abrupt disconnect may occur not due to the customer but rather due to processor error or exceptions in the IVR system itself or network issues.

Abrupt disconnections have become especially prevalent with the widespread use of wireless communication devices, such as cellular phones, VoIP, and the like, which have created a number of problems for contact centers. The longer a wireless contact remains in queue, for example, the more air time minutes are consumed, with a concomitant increase in the cost to the customer associated with the interaction with the contact center.

These costs have led many users to disconnect or abandon the contact when the wait time reaches a perceived level of unacceptability. Wireless communication device, VoIP, and the like, users also experience disconnects as a result of service disruptions (e.g., dead zones, cell transitions, dropped packets, internet service provider problems, and the like). Furthermore, as mentioned previously, calls may be abruptly disconnected due to network issues or processing error/exceptions in the IVR systems.

When contacts are dropped, the customer ordinarily reconnects with the contact center again and end ups being re-queued from the very beginning. The re-queuing or "starting over" can lead to further frustrations caused by increased air time minutes required to interact with the contact center. Finally, many wireless customer contacts encounter poor call quality while waiting in queue. When the contact is ultimately serviced, the poor call quality may detrimentally impact the ability of the contact center to provide satisfactory service. Again, the customer contact may abruptly disconnect for this and/or a combination of the aforementioned reasons.

Although some contact centers permit a customer contact to "opt out" under specified circumstances, the contact centers usually wait for the call to be delivered to the agent before calling back the caller. Such call center products, for example, are offered by Genesys and Zeacom. These products allow a customer to maintain his or her place in queue and have the system contact the customer once the contact, e.g., the call, is delivered to the agent. These known products virtually maintain the caller's place in queue without the caller having to be physically connected.

The failure to synchronize the initiation of the contact with the agent being ready to service the contact can unnecessarily tie up contact center resources, such as the servicing agent, waiting for the customer to respond and lengthen the time required for the customer to receive service or complete its transaction.

In addition, the customer may wish to be reconnected into the previous IVR session instead of being contacted by an agent. In these types of situations, it would be advantageous for that customer to receive either a voice message, instant message or an SMS (i.e., text message), providing stored IVR information (e.g., options keystring) to allow the caller to resume the IVR session at the point he/she left off from the previous contact.

Known systems generally provide for a means to resume a session between a customer contact and an IVR system and routing the customer to the point where the previous session was abruptly disconnected. Furthermore, stored status information retrieved will set the session to be resumed according to that status information. Customized IVR menu scripts, which correspond to the status information, may be invoked in order to resume the session where it was abruptly disconnected.

Although these known processes assist in somewhat satisfying customers' needs, precious automated processing resources, as well as service agent and manager resources, are utilized and expended in an effort to re-connect a customer contact where an apparent abrupt disconnected had been detected. This includes, but is not limited to, storing the previous IVR session, storing the status information, along with the options selected on the IVR system, and notifying the customer via voice message, instant messaging or SMS containing, for example, the options keystring selected before the disconnect.

However, with these aforementioned provisions being expended, there is no way of knowing if the customer contact is ultimately satisfied, or has been provided with sufficient options, with such call re-connect efforts. Stated another way, there are no known systems or methods that provide the customer contact with options to decide where in the IVR session to resume, and furthermore where such options may be dependent upon variations of contact abrupt disconnecting scenarios.

Thus, there is a need for a system and method for managing abrupt contact disconnects where the customer is provided with options and where such options may be based upon variations of the disconnect scenarios.

SUMMARY

These and other needs are addressed by the various embodiments and configurations of the present invention. Embodiments of the present invention generally relate to a system and method for managing abrupt disconnects at a contact center.

As used herein, a "transitory contact" refers to a contact, on any channel using any medium, that is disconnected or terminated prematurely or before delivery to an agent for servicing. A "transaction" refers generally to an interaction with a contact center resource. Typically, the transaction is an item of business, such as the taking and processing an order, providing product-related assistance, providing personal financial information, providing billing information, scheduling product service, and the like. A "transaction initiator" refers to an entity, such as a human or computational component, that initiates or causes the initiation of a transaction.

In an embodiment of the present invention, there is provided a method for managing abrupt customer call disconnects from an IVR system, dependent upon variations of call disconnect scenarios, comprising detecting an abrupt customer call disconnect; storing IVR options selected by customer before the abrupt customer call disconnect; sending an SMS/voice message notification to the customer; receiving customer call re-connection; determining whether there is status information of an abnormally terminated call corresponding to the customer call re-connection; retrieving status information of the abnormally terminated call; connecting the IVR system to the customer; and providing IVR system options to the customer based upon the particular disconnect scenario.

The SMS/voice message notification may comprise a keystring of selected IVR options and a reference number wherein the determining step may further comprise requesting the reference number from the customer to identify and verify the re-connected customer call. The IVR system options provided to the customer may comprise the option of directly jumping to the last saved option of the abruptly disconnected call, or the option of following the normal IVR system option flow.

In accordance with another embodiment of the present invention, there is provided a method for managing abrupt customer call disconnects from an IVR system, dependent upon variations of call disconnect scenarios, comprising providing a gateway for receiving a new customer call; executing call control XML (CCXML) to launch a self service application (SSA); collecting customer information and input data; storing the customer information and input data in a database; detecting an abrupt customer call disconnect; exiting the SSA upon detecting the abrupt customer call disconnect; retaining customer information and input data in the database; sending an SMS/voice message notification to the customer including an IVR options keystring and a reference number; determining, upon customer call re-connect, whether there is status information of an abnormally terminated call corresponding to the customer call re-connect; retrieving status information of the abnormally terminated call from the database; connecting the IVR system to the re-established customer call; and providing IVR system options to the customer based upon the particular disconnect scenario.

In accordance with another embodiment of the present invention, there is provided a method for managing abrupt customer call disconnects from an IVR system, dependent upon variations of call disconnect scenarios, comprising providing a gateway for receiving a new customer call; executing call control XML (CCXML) to launch a self service application (SSA); collecting customer information and input data; storing the customer information and input data in a database; receiving an agent request from the customer; launching a wait treatment application (WTA); playing the WTA to the customer; detecting an abrupt customer call disconnect; exiting the WTA upon detecting the abrupt customer call disconnect; retaining customer information and input data in the database; sending an SMS/voice message notification to the customer including an IVR options keystring and a reference number; determining, upon customer call re-connect, whether there is status information of an abnormally terminated call corresponding to the customer call re-connect; retrieving status information of the abnormally terminated call from the database; connecting the IVR system to the re-established customer call; and providing IVR system options to the customer based upon the particular disconnect scenario that occurred during the IVR session.

In accordance with yet another embodiment of the present invention, there is provided a system for managing abrupt customer call disconnects from an IVR system, dependent upon variations of call disconnect scenarios, comprising a gateway for receiving a customer call signal; a session manager for receiving the customer call signal from the gateway; a media processing platform (MPP) for receiving the customer call signal from the session manager; an application server for hosting call control XML (CCXML) and a self service application (SSA) to be fetched by the MPP; a database for storing customer information and input data received from the customer collected by the SSA; wherein, upon a customer call re-connect from an abrupt customer call disconnect, the system provides the customer with IVR system options based upon the particular disconnect scenario that occurred during the IVR session.

BRIEF DESCRIPTION OF THE DRAWINGS

So the manner in which above recited features of the present invention can be understood in detail, a more particular description of embodiments of the present invention, briefly summarized above, may be had by reference to embodiments, several of which are illustrated in the appended drawings. It is to be noted, however, the appended drawings illustrate only typical embodiments encompassed within the scope of the present invention, and, therefore, are not to be considered limiting, for the present invention may admit to other equally effective embodiments, wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including but not limited to. To facilitate

DETAILED DESCRIPTION

Embodiments of the present invention generally relate to a system and method for providing customers options to either start from the first step in an IVR session or jump to the step where the customer was abruptly disconnected. Also, if a customer call disconnects from the IVR system, during transferring the call from one application to another (e.g., from SSA to WTA), the system and method are capable of storing the session information along with the options keystring and notifying the customer via SMS, instant messaging or voice message response, if enabled. Finally, embodiments of the present invention relate to a system and method that provide for the ability to jump directly to the last IVR option selected in an abruptly disconnected contact depending upon variations of call disconnecting scenarios.

Embodiments of the present invention, therefore, provide for improved customer satisfaction, reduced call duration time and reduced IVR system processing demands and load because with options available to the customer, dependent upon the various disconnect scenarios, certain IVR sessions may not have to be started from the beginning or begun at all. For example, certain call disconnect scenarios where the session information need not be saved include: if the IVR application hangs up (after application flow completion); or the customer hangs up the call by any means; or if an outbound call is made by the IVR system and customer hangs up the call.

Embodiments of the present invention will be illustrated below in conjunction with an exemplary contact center communication system. Although well suited for use with, e.g., a system having an Automatic Call Distribution system (ACD) or other similar contact processing switch, the present invention should not be considered by one of ordinary skill in the art to be limited to use with any particular type of communication system switch or configuration of system elements. Those skilled in the art will recognize the disclosed techniques may be used in any communication application in which it is desirable to provide improved contact processing.

Figure 1:
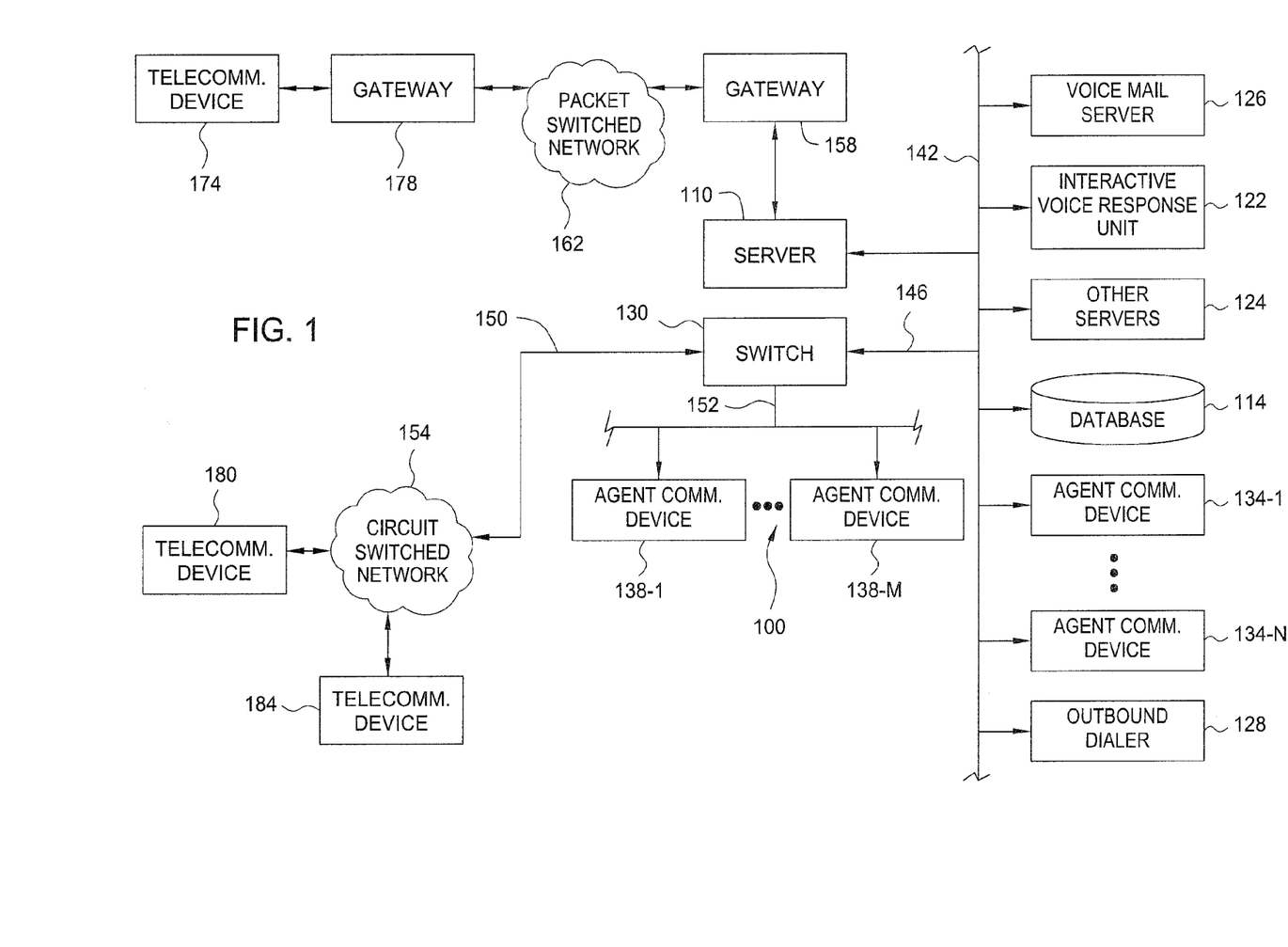
FIG. 1 is a block diagram depicting a contact center in accordance with an embodiment of the present invention.

FIG. 1 shows an illustrative embodiment of the present invention. A contact center 100 comprises a central server 110 (described in more detail in connection with FIG. 2), a set of data stores or databases 114 containing contact or customer related information and other information that can enhance the value and efficiency of the contact, and a plurality of servers, namely a voice mail server 126, an Interactive Voice Response (IVR) unit/system 122, and other servers 124, an outbound dialer 128, a switch 130, a plurality of working agents operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 146 to the switch 130. As will be appreciated, the other servers 124 can also include a scanner (which is normally not connected to the switch 130 or Web server), VoIP software, video call software, voice messaging software, an IP voice server, a fax server, a web server, and an email server) and the like. The switch 130 is connected via a plurality of trunks 150 to the Public Switch Telecommunication Network (PSTN) 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of telecommunications system switch or server, as well as other types of processor-based communication control devices such as media servers, computers, adjuncts, etc.

The server and/or switch can be a software-controlled system including a processing unit (CPU), microprocessor, or other type of digital data processor executing software or an Application-Specific Integrated Circuit (ASIC) as well as various portions or combinations of such elements.

Figure 2:
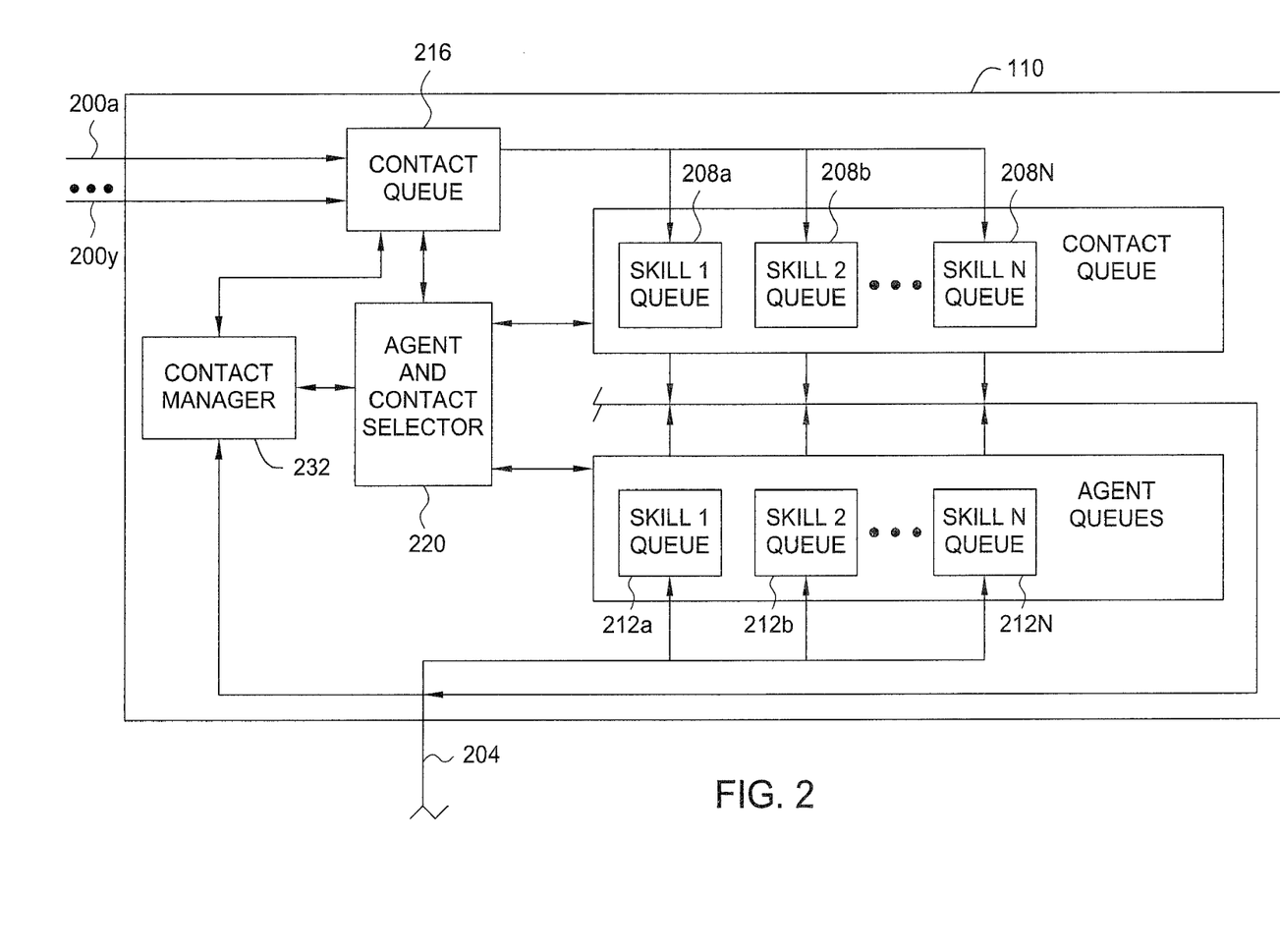
FIG. 2 is a block diagram depicting a server in accordance with an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line). The server 110 can include a Basic Call Management System (BCMS) (not shown) and a Call Management System (CMS) (not shown) that gathers call records and contact-center statistics for use in generating contact-center reports.

The switch 130 and/or server 110 can be any computer and/or telecommunication architecture for directing contacts to one or more telecommunication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™; Communication Manager™, and/or S8300™ media server.

Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (NIC) (not shown) to provide services to the serviced telecommunication devices. Other types of known switches and servers are well known in the art and therefore not described in detail herein.

Referring again to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and either are enqueued in individual ones of the contact queues 208a-n in their respective orders of priority or are enqueued in different ones of a plurality of contact queues that correspond to a different priority.

Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill. Each one of which corresponds to a different expertise level.

A contact vector 216 is included among the control programs in the server 110. Contacts incoming to the contact center are assigned by contact vector 216 to different contact queues 208a-n based upon a number of predetermined criteria, including customer identity, customer needs, contact center needs, current contact center queue lengths, customer value, and the agent skill required for the proper handling of the contact. Agents who are available for handling contacts are assigned to agent queues 212a-n based upon the skills they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring is described in DEFINITY Communications System Generic 3. Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring again to FIG. 1, the gateway 158 can be Avaya Inc.'s, G700 Media Gateway™ and may be implemented as hardware such as via an adjunct processor (as shown) or as a chip in the server.

The first telecommunication devices 134-1, . . . 134-N are packet-switched and can include, for example, IP hardphones such as the Avaya Inc.'s, 4600. Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises directly serviced by the switch. More particularly, these extensions correspond to conventional telecommunication device endpoints serviced by the switch/server, and the switch/server can direct incoming contacts or calls to and receive outgoing contacts or calls from these extensions in a conventional manner. The second telecommunication devices can include, for example, wired and wireless telephones, PDAs, H.320 video phones and conferencing units, voice messaging and response units, and traditional computer telephony adjuncts.

It should be noted the present invention does not require any particular type of information transport medium between switch or server and first and second telecommunication devices. That is, the present invention may be implemented with any desired type of transport medium as well as combinations of different types of transport media.

The packet-switched network 162 can be any data and/or distributed processing network, such as the Internet. The network 162 typically includes proxies (not shown), registrars (not shown), and routers (not shown) for managing packet flows.

The packet-switched network 162 is in (wireless or wired) communication with an external first telecommunication device 174 via a gateway 178, and the circuit-switched network 154 with an external (wired) second telecommunication device 180 and (wireless) third telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In one configuration, the server 110, network 162, and first telecommunication devices 134 are Session Initiation Protocol (SIP) compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be understood the configuration of the switch, server, user telecommunication devices, and other elements as shown in FIG. 1 is for purposes of illustration only and should not be construed as limiting the present invention to any particular arrangement of elements.

As will be appreciated, the central server 110 is notified via LAN 142 of an incoming contact (a.k.a., call) by the telecommunications component (e.g., switch 130, fax server, email server, web server, and/or other server) receiving the incoming contact. The incoming contact is held by the receiving telecommunications component until the server 110 forwards instructions to the component to forward or route the contact to a specific contact center resource, such as the IVR unit 122, the voice mail server 126, and/or first or second telecommunication devices 134, 138 associated with a selected agent.

The server 110 distributes and connects these contacts to telecommunication devices of available agents based on the predetermined criteria noted above. When the central server 110 forwards a voice contact to an agent, the central server 110 also forwards customer-related information from databases 114 to the agent's computer work station for viewing (such as by a pop-up display) to permit the agent to better serve the customer. The agent will then process the contacts sent to him/her by the central server 110.

According to embodiments of the present invention, included among the programs executing on the server 110 are an agent and contact selector 220 and contact manager 232. The selector 220 and manager 232 are stored either in the main memory or in a peripheral memory (e.g., disk, CD ROM, etc.) or some other computer-readable medium of the center 100. The selector and manager collectively effect an assignment between available contacts in a queue and available agents serving the queue in a way that tends to maximize contact center efficiency. The selector 220 uses predefined criteria in selecting an appropriate agent to service the contact. The manager 232 determines and identifies transitory (e.g., disconnected) contacts requiring special treatment and, depending on the special treatment, provides instructions to the selector 220 to effect the special treatment.

The contact manager, based on one or more selected criteria, determines whether a transitory contact is entitled to special treatment by the contact center. Special treatment includes holding the transitory contact's position in queue, scheduling a call back on the same channel before the position is eligible for delivery to an agent for servicing, providing the transitory contactor with a favored position in queue if the customer re-connects within a selected period of time, providing a transitory customer with a wait time allowance if the customer re-connects within a certain period of time, retaining data received from the customer during the transitory contact in memory or a database for a specified period of time in the event of a customer re-contact, and contacting the transitory customer on another channel.

Holding the transitory contact's position in queue effectively provides the transitory customer with a virtual queue position. After termination of the transitory contact, the customer can re-contact or reconnect to the contact center and obtain his or her queue position reflecting advancements during the termination of the contact and the re-contact. For example, if the customer was fifteen positions from the head of the queue when the transitory contact terminated and ten enqueued contacts were serviced from the queue during the time between the termination and re-contact by the transitory customer, the re-contact would be placed in a queue position that was five positions from the head of the queue.

Assuming the customer does receive the virtual queue position, he or she could have other types of special treatment applied upon the maturity of the virtual queue position to a specified queue position such as the "next call for deliver" or "ncfd" queue position. For instance, further advancement in the queue could be retarded for an administrable time to afford the contactor more time to reclaim the position which would subsequently commence normal advancement upon re-contact.

Alternately, upon maturation to a specified queue position, such as the ncfd+1 queue position, the virtual queue position could also be moved backwards in the queue or transferred to another queue established for the purpose of queuing mature transactions pending re-contact.

The contact center may include an IVR (or some form of automated system) to interact with the called back customer. The IVR, when the call re-connect is answered, could inform the customer that the virtual queue position is now ready for servicing and provide the option to hold while the call is connected to an agent or resume to the normal IVR option flow. It may also include an estimate of the wait time until the call is serviced by an agent and/or verify that the customer is the same as the person requesting the call back.

Providing the transitory customer with various options in queue if the customer calls back within a selected period of time permits the transitory customer to voluntarily or involuntarily terminate the contact and, within the selected period of time, call back and obtain a better queue position than if he/she had called in the for the first time after the selected period of time. The queue position may be the same as the virtual queue position. It may also be at a lower or higher queue position.

Contacting the transitory customer on another channel can range from calling a cellular phone customer back on a wired phone, calling a customer using a packet-switched connection back on a circuit-switched connection, and sending the customer an email, SMS, instant message, page, and the like indicating the system noticed a disconnect and inquiring if the customer is still in need of assistance. If the customer is in need of assistance, various further contact options can be provided to the customer.

It is understood by embodiments of the present invention that a server, such as the one depicted in FIG. 2, may be connected to a computer network or system. A computer network includes the Internet, a global computer network, an internal computer network, dedicated server networks, and the like.

Figure 3:
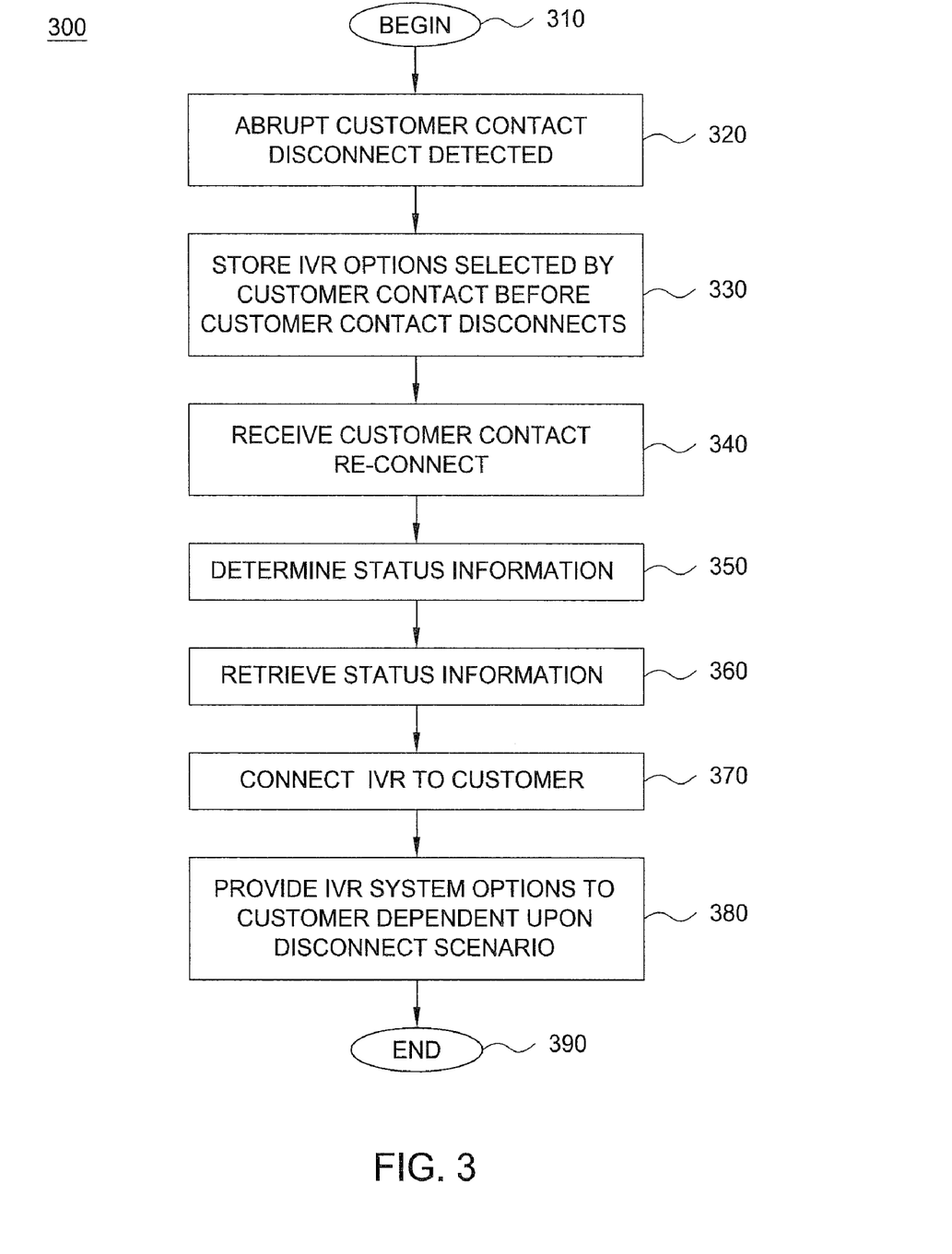
FIG. 3 is a flow chart depicting a method for managing an abrupt call disconnect at the call center of FIG. 1 in accordance with an embodiment of the present invention.

The operation of the contact manager 232 in accordance with embodiments of the present invention is provided in FIG. 3, which depicts a method for managing an abrupt call disconnect from an IVR system at the contact center of FIG. 1, in accordance with an embodiment of the present invention. In step 310, the method begins with monitoring contact center in-coming contacts. In step 320, the contact manager 232 detects an abrupt customer call disconnect. At step 330, the IVR options selected by the customer are stored before the abrupt customer call is disconnected.

At step 340, after an SMS/voice message notification has been sent to the customer with an IVR keystring and reference number, the system receives a customer call re-connection. At step 350, the method further comprises determining whether there is status information of an abnormally terminated call corresponding to the customer call re-connection. At step 360, after determining corresponding status information, the method further comprises retrieving status information of the abnormally terminated call and at step 370 connecting the IVR system to the customer. At step 380, the method further comprises providing IVR system options to the customer based upon the particular disconnect scenario. The options include, but are not limited to, jumping directly to the last IVR option selected during the abruptly disconnected call, following the normal IVR (SSA) option flow, or jumping to the agent waiting queue in the keystring.

Figure 4:
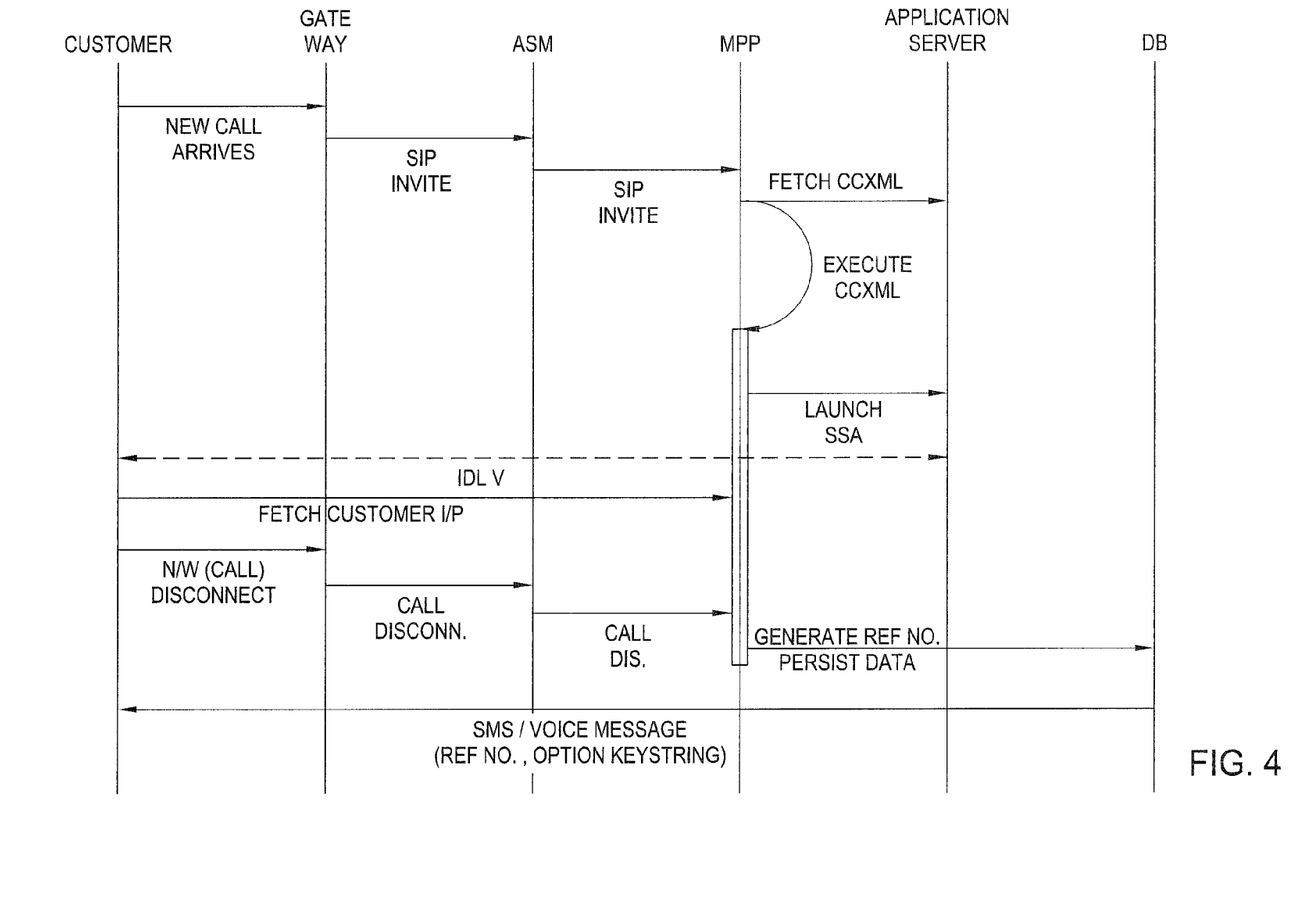
FIG. 4 is a sequence diagram of a method for managing an abrupt call disconnect scenario at the call center of FIG. 1 where the abrupt call disconnect occurs while SSA is being played, in accordance with an embodiment of the present invention.
Figure 5:
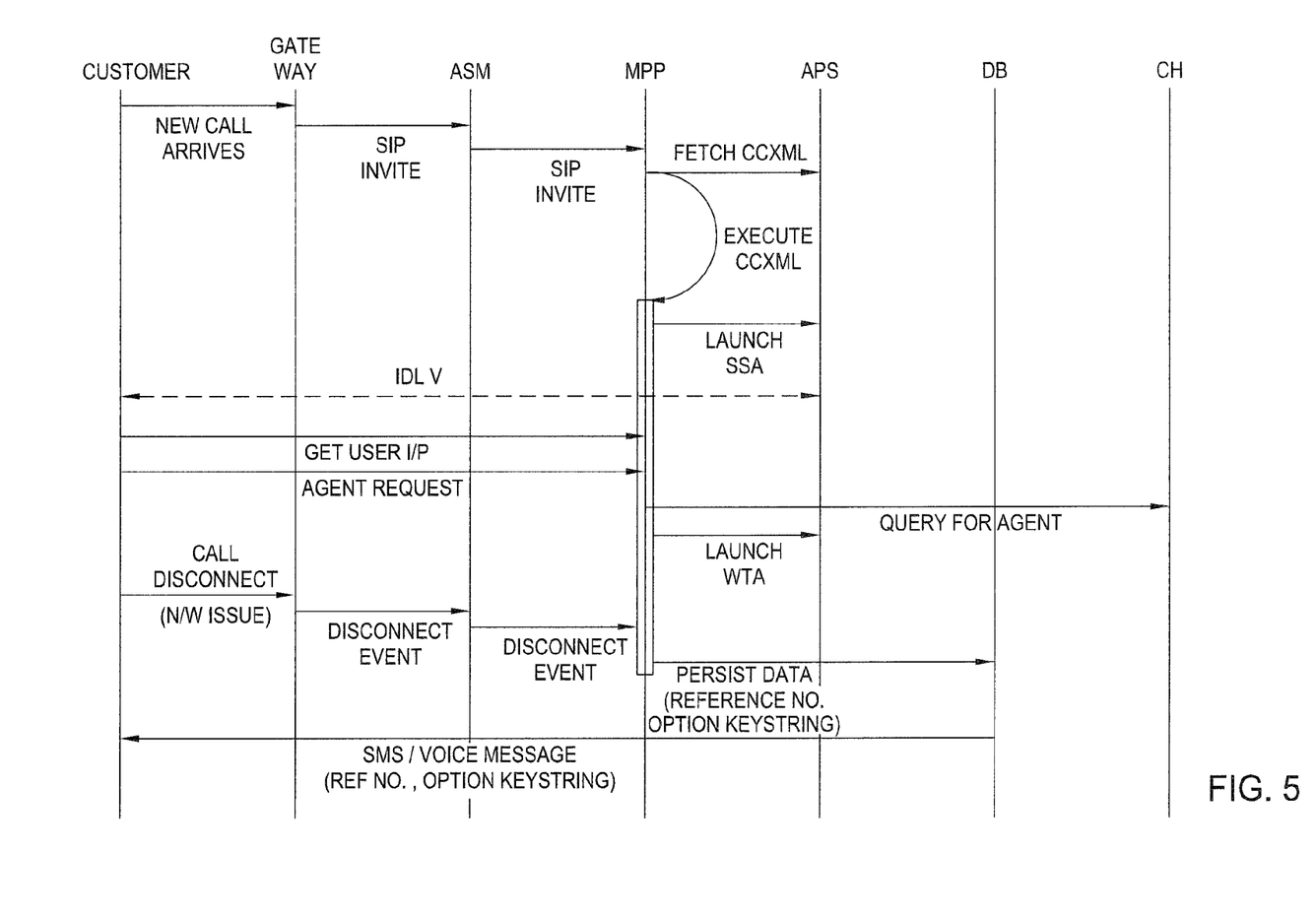
FIG. 5 is a sequence diagram of a method for managing an abrupt call disconnect scenario at the call center of FIG. 1 where the abrupt call disconnect occurs while WTA is being played, in accordance with an embodiment of the present invention.
Figure 6:
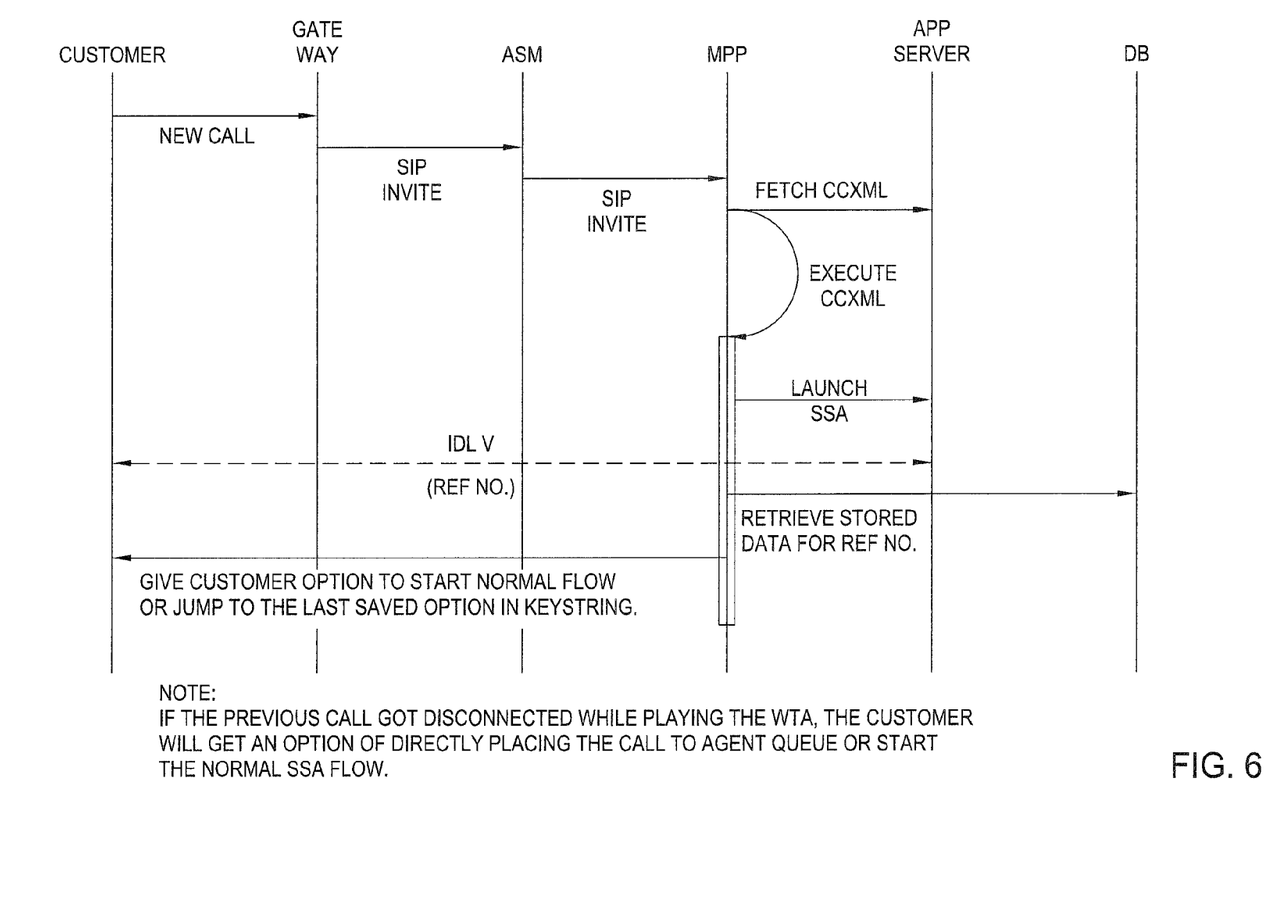
FIG. 6 is a sequence diagram of a method for managing the call re-connect from a customer after an abrupt call disconnect scenario at the call center of FIG. 1, in accordance with an embodiment of the present invention.

The following examples are demonstrative of embodiments of the present invention and should be read with reference to FIGS. 1-3 as well as the particular exemplary sequence diagrams FIGS. 4-6, depicting various abrupt call disconnect scenarios.

Example 1

Disconnect and Re-Connect During an SSA Session

In the following example, taken in conjunction with FIGS. 4 and 6, a customer contact is made to the system and then is disconnected abruptly due to a network issue or a process exception in an IVR system during an SSA session.

The customer contacts the contact center for the first time and is received by the IVR system. The customer selects IVR options on an SSA (Self Service Application) to proceed further. After selecting a few options in SSA, the contact gets disconnected abruptly. On contact disconnect, the IVR system stores IVR options selected by the customer before the abrupt disconnect. The IVR system sends an SMS/voice message or instant message notification to the transitory customer, containing a keystring of selected options and a reference number. The transitory customer re-connects to the IVR system.

The IVR system determines whether there is status information of an abnormally terminated call corresponding to the re-connected transitory contact. The IVR system retrieves the status information of the abnormally terminated contact. Then, the IVR system re-establishes the call. The IVR system gives the option to the customer to directly jump to the last saved step of the abruptly disconnected call or the option to follow the normal IVR (SSA) option flow.

Example 2

Disconnect During a WTA Session

In the following example, taken in conjunction with FIG. 5, a contact is disconnected abruptly due to a network issue or a process exception in an IVR system during a WTA session.

The customer first time calls and is received by the IVR system. He/she selects options on SSA to proceed further. The customer requests an agent. The current application (e.g. Self Service App) will exit. The session information and selected option keystring will be saved to parent application (e.g., Call Control App.). The call will be transferred to next application (e.g., Wait Treatment App.). The call gets disconnected abruptly.

On call disconnect, IVR system stores options selected by customer before disconnect. IVR system sends SMS/voice message notification to the customer, containing keystring of selected options. The customer re-connects to the IVR system. The IVR system determines whether there is status information of an abnormally terminated or disconnected call corresponding to the re-connection. The IVR system retrieves the status information of the abnormally terminated or disconnected call. The IVR system establishes the call. The IVR system gives the option to the customer to directly jump to queue for an agent or the option to follow the normal IVR option flow.

In yet another embodiment of the present invention, there is provided other call disconnect scenarios:

Example 3

Disconnect Scenarios where Information not Saved

Example 3.1

The customer first time calls at the IVR system. He/she selects options on IVR app (SSA) to proceed further. The IVR app (SSA) transfers the call to available agent and exits. Call gets disconnected due to network issue. Session information and selected option keystring will not be saved.

Example 3.2

The customer first time calls at the IVR system. He/she selects options on the IVR app (SSA) to proceed further. The customer hangs up the call. The session information and selected option keystring will not be saved.

Example 3.3

An outbound call is made by the IVR system. The customer hangs up the call. Session information and selected option keystring will not be saved.

An advantage of embodiments of the present invention includes the fact that the customer is given the option to jump directly to step from where the caller disconnected abruptly. The customer should be notified of call disconnect via SMS/voice/instant message containing abruptly disconnected call's selected options keystring. This improves customer satisfaction, reduces the call duration as no need to go through the IVR options again, reduces IVR load.

Example 4

Call Disconnected while SSA is Played

This example discusses a disconnect scenario and the system elements utilized in connection with an embodiment of the present invention.

The customer initiates a new call which lands on the gateway. The gateway sends the new call arrival signal to Session Manager, which sends the new call arrival sign to Media Processing Platform (MPP). The MPP fetches CCXML hosted on the Application Server and starts executing the CCXML. The CCXML on receiving call control launches SSA hosted on Application Server. The CCXML along with SSA will collects customer information (ID&V) and input data (keystrings) and will store the customer information and input data into a database. The customer call gets disconnected due to network issue.

The call disconnected signal is passed from Gateway to ASM and then to MPP. The MPP will notify the CCXML about the call disconnect and the CCXML in turn will exit the running SSA. Once the SSA is exited, the stored customer data (along with selected options keystrings) is persisted in the database. On the database update, automated SMS/voice or instant message notification contains the reference number and option keystring will be sent to the customer.

On customer re-connect, the customer calls back and the call lands on the gateway, which sends the new call arrival signal to the Session Manager to the MPP. The MPP will fetch the CCXML hosted on the Application Server and the CCXML on receiving call control launches SSA hosted on Application Server. The SSA asks for the reference number of abruptly disconnected previous call. The customer provides the reference number received via SMS/voice or instant message after previous call disconnect.

The CCXML along with SSA will perform ID&V based on collected customer information (and reference number, if provided). After verifying customer information in database, the CCXML retrieves the saved selected option keystring from the database. The CCXML will give the option of starting the normal SSA flow or jump to the last saved option in keystring. The last disconnect data will be discarded from database.

Example 5

Call Disconnected while WTA is Played

The customer initiates a new call which lands on the gateway. The gateway sends the new call arrival signal to Session Manager. The Session Manager sends the new call arrival signal to Media Processing Platform (MPP), which fetches the CCXML hosted on Application Server. The MPP starts executing the CCXML.

The CCXML on receiving the customer contact control launches SSA on the Application Server. The CCXML along with SSA will collect customer information (ID&V) and input data (keystrings) and will store the customer information and input data in the database. While the SSA is played, the customer requests for an agent (Service Personnel). The CCXML will query the CM (sending the skill information requested by customer) for the agent. While the agent becomes available, Wait Treatment Application (WTA) is launched by CCXML and is played to the customer. The customer call gets disconnected due to network issue.

The call disconnected signal is passed from gateway to SM and then to the MPP. The MPP will notify CCXML about the call disconnect. The CCXML in turn will exit the running WTA. Once the WTA is exited, the stored customer data (along with selected options keystrings) is persisted in the database. On the database update, automated SMS/voice and instant message notification contain the reference number and option keystring will be sent to the customer.

On the customer re-connect, the customer calls back and the call lands on the gateway. The gateway sends the new call arrival signal to the Session Manages to MPP. The MPP will fetch the CCXML hosted on Application Server. The CCXML on receiving call control launches SSA hosted on the Application Server. The SSA asks for the reference number of abruptly disconnected previous call. The customer provides the reference number received via SMS/voice or instant message after previous call disconnect.

The CCXML along with SSA will perform ID&V based on collected customer information (and reference number, if provided). After verifying customer information in the database, the CCXML retrieves the saved selected option keystring from the database. The CCXML will give the option of starting the normal SSA flow or jump to the agent waiting queue in keystring. The WTA is played if customer selects to jump to the agent queue directly. The last disconnect data will be discarded from the database.

A number of variations and modifications of embodiments of the present invention can be used. It would be possible to provide for some features of the present invention without providing others.

For example, there could be multiple re-contact periods or thresholds with various assigned options. By way of illustration, upon or after the expiration of a first threshold (without a further contact by the customer who terminated the initial contact prematurely), an alternate channel/media, such as email, may be used to provide the user with a custom destination (i.e., Universal Resource Locator or URL, phone number, IP address, etc.) for the caller to go to and reclaim the expired options based on providing certain information, possibly a key, access code, or some identification (such as phone number or some combination thereof) known to or previously to the customer by the contact center.

Correct entry of the information could result in reinstatement of expired options, for instance, associated with a new (administrable) queue position established on their behalf. The new queue position may be the same as or different from a virtual queue position originally assigned to the initial customer contact.

The present invention may be implemented as software, hardware (such as a logic circuit), or a combination thereof.

The present invention, in various embodiments, includes components, methods, processes, systems and/or apparatus substantially as depicted and described herein, including various embodiments, sub-combinations, and subsets thereof. Those of skill in the art will understand how to make and use embodiments of the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights that include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for managing abrupt customer call disconnects from an IVR system, dependent upon variations of call disconnect scenarios, comprising:
   providing a gateway for receiving a new customer call;
   executing call control XML (CCXML) to launch a self service application (SSA);
   collecting customer information and input data;
   storing the customer information and input data in a database;
   receiving an agent request from the customer;
   launching a wait treatment application (WTA);
   playing the WTA to the customer;
   detecting an abrupt customer call disconnect;
   exiting the WTA upon detecting the abrupt customer call disconnect;
   retaining customer information and input data in the database;
   sending an SMS/voice message notification to the customer including an IVR options keystring and a reference number;
   determining, upon customer call re-connect, whether there is status information of an abnormally terminated call corresponding to the customer call re-connect;
   retrieving status information of the abnormally terminated call from the database;
   connecting the IVR system to the re-established customer call; and
   providing IVR system options to the customer based upon the particular disconnect scenario that occurred during the IVR session.

2. The method of claim 1, wherein the CCXML of the IVR system provides the IVR system options to the customer.

3. The method of claim 2, wherein the IVR systems options comprise the option of starting the normal SSA flow, or the option of connecting to the agent in the IVR keystring.

4. The method of claim 3, wherein if the customer chooses to connect to the agent, then the method further comprises playing the WTA to the customer while waiting for the agent.

5. A system for managing abrupt customer call disconnects from an IVR system, dependent upon variations of call disconnect scenarios, comprising:
   a gateway for receiving a customer call signal;
   a session manager for receiving the customer call signal from the gateway;
   a media processing platform (MPP) for receiving the customer call signal from the session manager;
   an application server for hosting call control XML (CCXML) and a self service application (SSA) to be fetched by the MPP;
   a database for storing customer information and input data received from the customer collected by the and SSA;
   wherein, upon a customer call re-connect from an abrupt customer call disconnect, the system provides the customer with IVR system options based upon the particular disconnect scenario that occurred during the IVR session,
   wherein the application server further hosts a wait treatment application (WTA), and
   wherein the disconnect scenario comprises the abrupt customer call disconnect occurring during a WTA session, and the customer is provided with the option of starting the normal SSA flow or the option of connecting to an agent in keystring.

6. The system of claim 5, wherein the disconnect scenario comprises the abrupt customer call disconnect occurring during an SSA session, and the customer is provided with the option of starting the normal SSA flow or the option of jumping to the last saved IVR option in a keystring.

* * * * *